Figure 1:
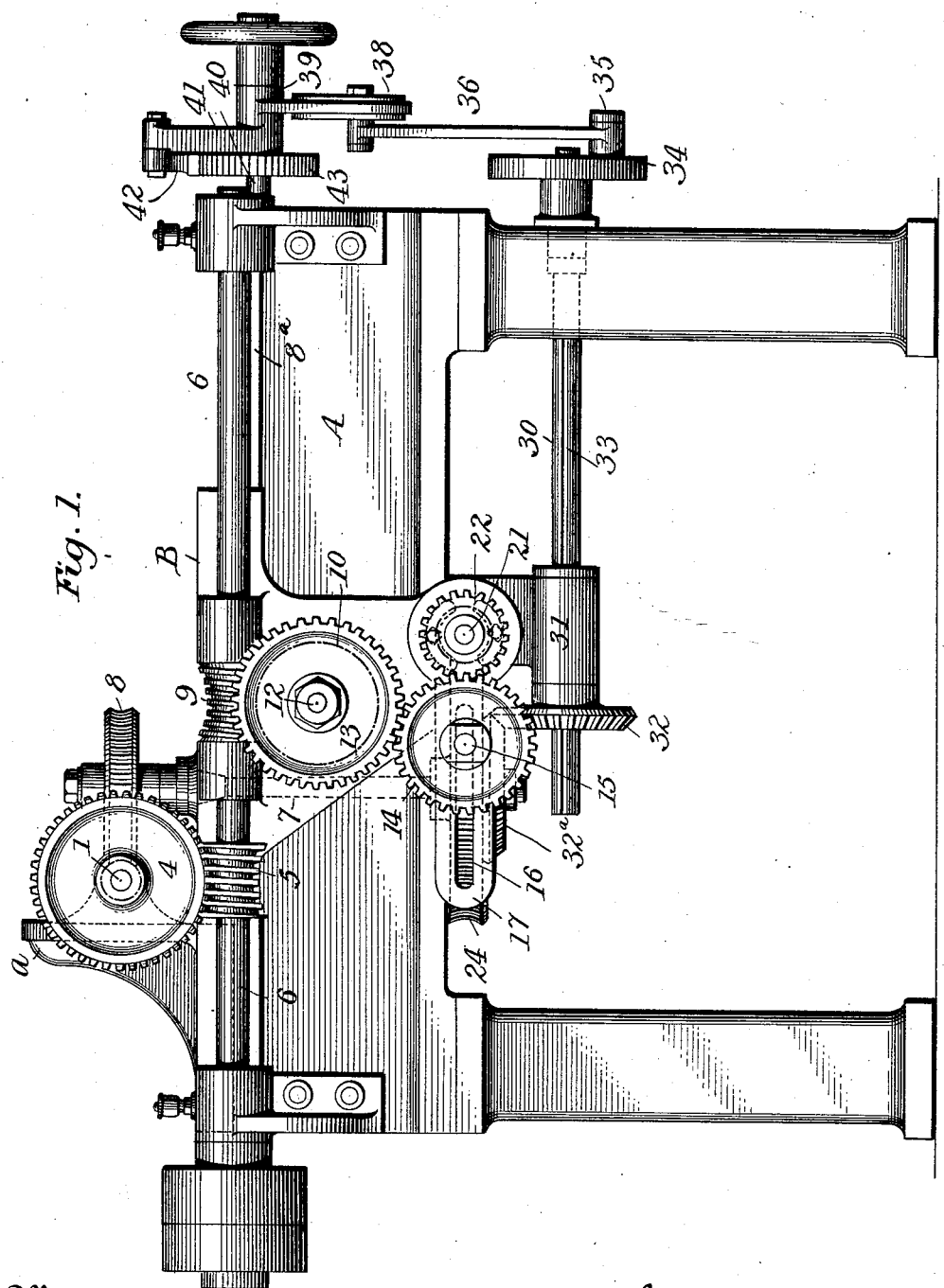

No. 606,700. Patented July 5, 1898.
W. H. BEASTOW.
GEAR CUTTING MACHINE.
(Application filed Sept. 30, 1895.)
(No Model.) 3 Sheets—Sheet 1.

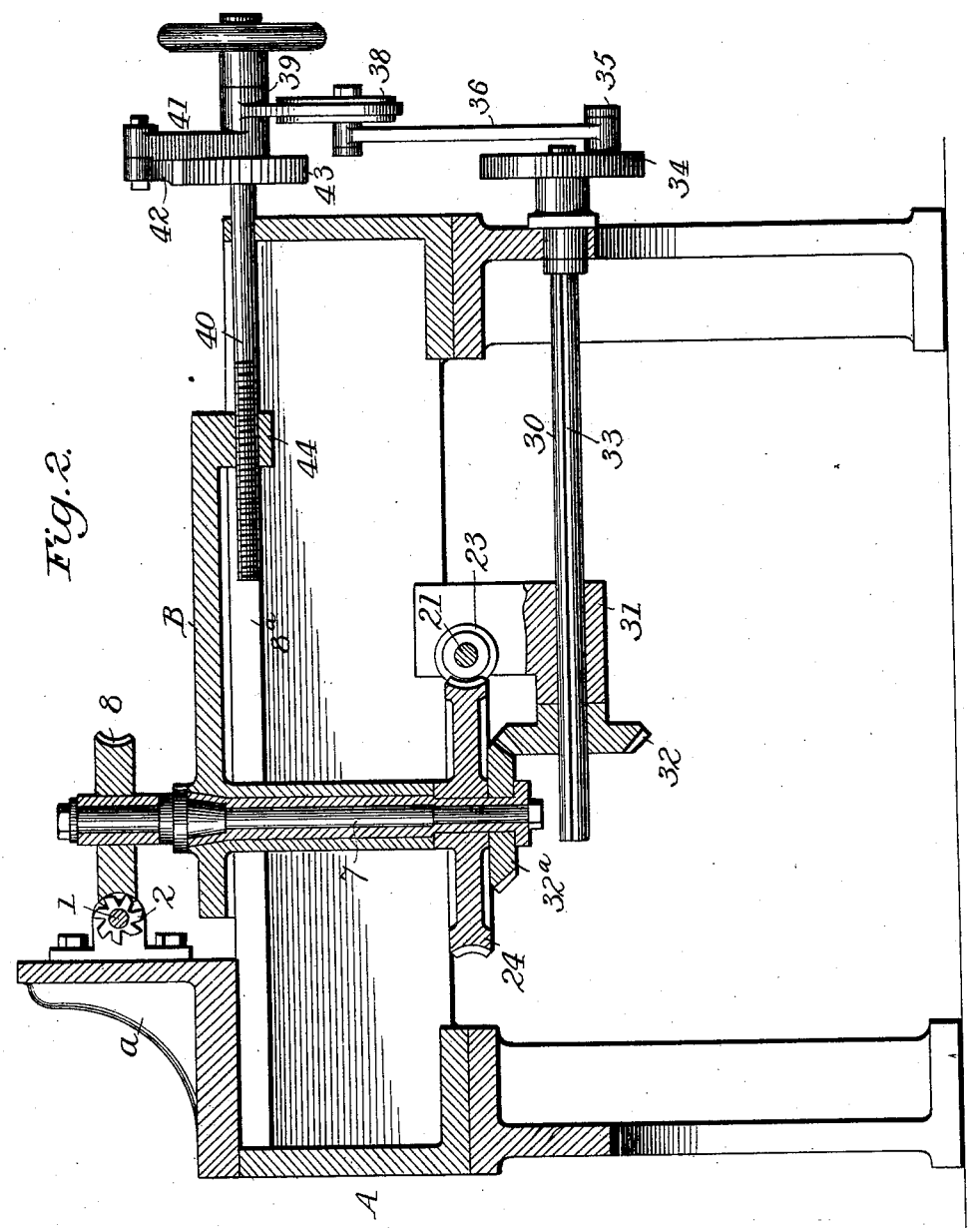

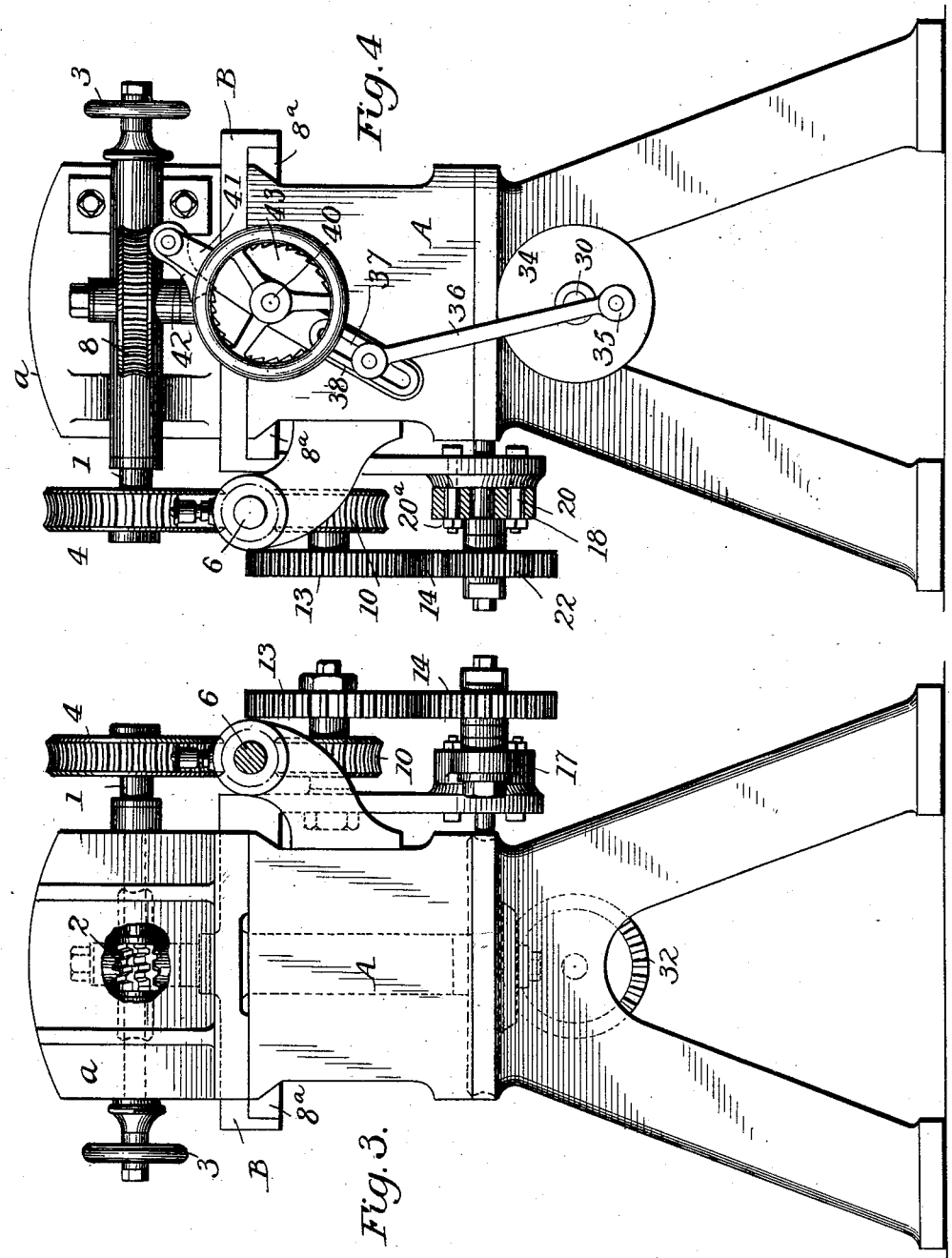

UNITED STATES PATENT OFFICE.

WILLIAM HENRY BEASTOW, OF MANCHESTER, ENGLAND, ASSIGNOR TO SAMUEL HERBERT BROOKS AND RICHARD ALEXANDER DOXEY, OF SAME PLACE.

GEAR-CUTTING MACHINE.

SPECIFICATION forming part of Letters Patent No. 606,700, dated July 5, 1898.

Application filed September 30, 1895. Serial No. 564,166. (No model.)

*To all whom it may concern:*

Be it known that I, WILLIAM HENRY BEASTOW, a subject of the Queen of Great Britain, residing at Manchester, England, have invented certain new and useful Improvements in Gear-Cutting Machines, of which the following is a specification.

This invention relates to an improvement in worm-gear-cutting machines; and its object is to provide a simple and efficient machine of the character described by the use of which worm-gears may be accurately and uniformly cut and all liability of undercutting the teeth is prevented.

With these objects in view the invention consists in the novel construction and arrangement of the parts hereinafter more fully described, and particularly pointed out in the claims.

In the accompanying drawings, forming a part of this specification, and in which like letters and figures of reference indicate corresponding parts, Figure 1 is a side elevation of the invention. Fig. 2 is a longitudinal sectional view of the same. Fig. 3 is an end elevation, and Fig. 4 is an opposite end elevation.

Referring to the drawings, A indicates the frame, provided near one end with uprights $a$, which support a horizontal transverse shaft 1, carrying a cutter 2, adapted to rotate in a vertical plane. A hand-wheel 3 and a worm-gear 4 are carried upon opposite ends of the shaft 1. The worm-gear is driven to rotate the cutter-shaft and the cutter carried thereon by means of an intermeshing worm-gear 5, mounted upon a driving-shaft 6, extending longitudinally at one side of the frame A.

The blank-supporting spindle 7 and its operating mechanism are arranged upon a carriage B, traveling on guides $8^a$ of the frame A. A step-by-step progressive movement toward the cutter is imparted to the carriage B by mechanism hereinafter described.

The blank-supporting spindle 7 is journaled vertically in the carriage B and is arranged in the same vertical plane as the cutter 2. Upon the upper end of the spindle 7 is supported the wheel-blank 8, arranged in the same horizontal plane as that occupied by the cutter-shaft 1 and adapted to be operated upon by the cutter 2, carried upon said shaft.

The wheel-blank 8 is adapted to rotate with its supporting-spindle 7, to which motion is imparted from the driving-shaft 6 through a worm 9, contacting with the carriage B and mounted to slide upon the driving-shaft as the carriage is shifted. The worm 9 intermeshes with a worm-gear 10, carried upon a short transverse shaft 12 of the carriage. A gear 13, likewise carried upon a shaft 12, engages with a corresponding gear 14, supported upon a shaft 15, which is journaled in a slot 16 of a vertically-adjustable frame 17. This frame is provided with segmental slots 18 and is pivotally supported at one end upon a shaft 21, extending transversely across the frame A. The slots 18 are adapted to receive bolts 20, which project through said slots from the carriage B and receive nuts $20^a$ or other suitable clamping devices at their ends, which bear against the frame 17 and hold it against movement.

A gear-wheel 22 intermeshes with the gear 14 and transmits motion to its supporting-shaft 21. This shaft also carries a worm 23, which engages with a horizontal worm-gear 24, carried upon the lower end of the blank-supporting spindle 7, by means of which said spindle and the wheel-blank carried thereby is rotated.

Ordinarily in machines for cutting worm-gears the wheel-blank is mounted loosely upon a suitable support located adjacent to the cutter and is rotated during the cutting of the teeth by frictional contact with the cutter. This construction is objectionable for the reason that the friction exerted on the teeth of the gear as it is dragged around by the cutter causes the teeth to be undercut, thereby impairing the strength of the gear and materially lessening its efficiency. In the present invention all liability of undercutting is avoided by imparting to both the cutter and the wheel-blank upon which it operates a positive rotary movement, thereby avoiding the friction exerted upon the wheel-blank in consequence of its being dragged around by the cutter.

The pitch of the teeth formed upon the wheel-blank is determined by the pitch of the cutting-surfaces of the cutter 2 and may be varied at will by substituting one cutter for another. The number of teeth formed upon the periphery of the wheel-blank is determined, however, by the speed at which the blank is rotated, and I have devised means which I will now describe for altering the rate of movement of said blank.

A slot 16 is formed in the adjustable frame 17 to receive the shaft 15 of the gear 14. This gear, as has already been stated, is arranged intermediate of the gears 13 and 22, the latter of which is connected by means of a worm 23 and worm-gear 24 to rotate the blank-supporting spindle 7. It will therefore appear that the rotation of the spindle 7 is increased or diminished accordingly as the diameter of the gear-wheel 22 is small or great, respectively. This gear 22 is located on the end of its supporting-shaft 21 at one side of the machine and may be readily removed from said shaft and a different-sized gear substituted.

Whenever a gear 22 of larger or smaller diameter is substituted for that already on the shaft 21, it becomes necessary to move the gear 14 toward or away from the said shaft in order to bring it to intermesh with both the gear 13 and gear 22. This may be accomplished by moving the shaft 15 to the desired point in the slot 16 of the frame 17 and then clamping it in place. Of course if the gear 14 is moved toward the gear 22 it will be necessary to move the axis of the former of these gears to a lower plane, or if it be moved from the gear 22 the plane of the axis of the gear 14 is elevated. This is accomplished by loosening the nuts 20$^a$ and elevating or lowering the end of the frame 17, as desired.

Any suitable mechanism may be employed for moving the carriage B, which carries the spindle 7 toward the cutter 2; but I prefer to employ those means which in practice have proved most effective. These means consist of a shaft 30, supported in one end of the frame A and in a depending portion 31 of the carriage B. A bevel-gear 32 is loosely supported upon the inner end of the shaft 30. This shaft is provided with a longitudinal rib or spline 33, which engages a corresponding recess in the bevel-gear 32, permitting the gear to slide upon the shaft 30. Motion is imparted to the bevel-gear 32 from the spindle 7 by means of a corresponding gear 32$^a$, supported at the lower end of said spindle. Upon the outer end of the shaft 30 is carried a wheel 34, the face of which is provided with a pin 35, to which one end of a connecting-rod 36 is connected. The opposite end of this connecting-rod engages a slot 37 in an arm 38 of a sleeve 39, loosely mounted upon one end of a screw-shaft 40. The sleeve 39 is provided with an additional arm 41, which carries a pawl 42, adapted to engage a ratchet-wheel 43, supported upon the screw-shaft 40, adjacent to the arm 41. The screw-shaft 40 is supported on the frame A near its outer end and engages a threaded recess in a depending portion 44 of the carriage B. It will thus be apparent that as the spindle 7 is rotated from the driving-shaft 6 it imparts a rotary movement to the shaft 30 and wheel 34 through the bevel-gears 32 and 32$^a$. At each rotation of the wheel 34 the connecting-rod 36 is caused to lift and depress the arm 38 and partially rotate the ratchet-wheel 43 and its screw-shaft. At each partial rotation of the screw-shaft 40 it moves the carriage B toward the cutter 2 by reason of its engaging the threaded opening of the carriage. The movements of the devices for adjusting the carriage B are so timed, however, that the blank-supporting spindle makes a complete revolution between each movement of the carriage B toward the cutter. By this arrangement it will be obvious that the spaces between the teeth of the wheel-blank are all formed of uniform depth.

After a worm gear-wheel has been cut a worm-gear may be formed on my machine, the worm of which will exactly conform to the pitch-line of the teeth of the said worm gear-wheel by placing a blank upon the shaft 1 and a cutter upon the spindle 7 and regulating the relative rotation of said shaft and spindle. In this way I am enabled to make the worm and the worm gear-wheel upon the same machine and to insure a closer and more accurate intermesh of the worm and gear than would be possible to obtain if they were formed upon separate machines.

It will be noted that any size worm or worm-wheel may be formed upon my machine, it being only necessary to adjust the carriage B to a position which will throw the edge of the blank or cutter carried on the spindle 7 into contact with the cutter or blank, respectively, of the shaft 1. Moreover, it will be noted that the operation of my machine is exceedingly simple, and all of the parts, most of which are at one side of the machine, are readily accessible and may be easily removed.

What I claim is—

1. In a gear-cutting machine, the combination of a cutter, means for rotating the same, a spindle adapted to hold the wheel-blank, a carriage for supporting the spindle means for rotating the spindle, and devices actuated by the rotation of the spindle for automatically moving the carriage toward the cutter, substantially as described.

2. In a gear-cutting machine, the combination of a driving-shaft, a cutter, means for rotating said cutter from the driving-shaft, a spindle adapted to hold the wheel-blank, a carriage in which the spindle is supported, means on the carriage adapted to be actuated by the driving-shaft to rotate the spindle, and devices actuated through the spindle for moving the carriage toward the cutter, substantially as described.

3. In a gear-cutting machine the combination of a driving-shaft, a cutter, means actuated by the driving-shaft for rotating said cutter, a spindle adapted to support the wheel-blank, a traveling carriage on which the spindle is supported, a worm-gear engaged by the carriage and mounted upon the driving-shaft to rotate therewith and move longitudinally thereon, and devices intermediate of the worm-gear and spindle whereby the latter is rotated, substantially as described.

4. In a gear-cutting machine the combination of a driving-shaft, a cutter, means actuated by the driving-shaft for rotating said cutter, a spindle adapted to support the wheel-blank, the gear-wheel 22, means intermediate of said gear and the spindle, the gear 13, intermediate gearing between said gear and the driving-shaft, an adjustable slotted frame, and a gear mounted in said frame, and arranged to intermesh with the gears 13 and 22, substantially as described.

5. In a gear-cutting machine the combination of a cutter means for rotating the same, a supporting-spindle adapted to hold the wheel-blank, means for rotating the spindle, a carriage for supporting the spindle and devices intermediate of the spindle and carriage driven by the spindle, whereby a progressive movement toward the cutter is imparted to the carriage, substantially as described.

6. In a gear-cutting machine, the combination with a rotating cutter and its operating means, a traveling carriage and means for moving the same, a spindle adapted to support a wheel-blank, mounted on the carriage, a driving-shaft, and gearing intermediate the driving-shaft and spindle for driving the latter, said gearing being supported wholly upon the carriage to move therewith, substantially as described.

7. In a gear-cutting machine, the combination of a cutter, means for operating the same, a supporting-spindle adapted to hold the wheel-blank, means for constantly rotating the spindle, devices for automatically moving the supporting-spindle farther toward the cutter after each rotation of said spindle, and adjustable devices for varying the relative movements of the spindle and cutter, substantially as described.

8. In a gear-cutting machine, the combination with a cutter and its operating means, a traveling carriage, and means for moving the same, a spindle adapted to support a wheel-blank mounted on the carriage, a driving-shaft, a chain of gears supported upon the carriage and arranged intermediate the driving-shaft and spindle for driving the latter, and an adjustable slotted support for one of said chain of gears, substantially as described.

9. In a gear-cutting machine, the combination of a cutter, means for operating the same, a traveling carriage a spindle supported on the carriage, a screw-shaft engaging the carriage, a ratchet-wheel secured upon said shaft, a pivoted arm carrying a pawl for engaging the ratchet-wheel and provided with a slot, and means engaging said slot for reciprocating the arm at predetermined intervals, substantially as described.

10. In a gear-cutting machine, the combination of a cutter, means for operating the same, a traveling carriage a spindle supported on the carriage, a screw-shaft engaging the carriage, a ratchet-wheel secured upon said shaft, a pivoted arm carrying a pawl for engaging the ratchet-wheel and provided with a slot, a shaft having a spline and a crank-pin, a connecting-rod engaging said crank-pin and the slot in the pivoted arm, a gear adapted to move longitudinally upon the splined shaft, and a gear supported on the traveling carriage through which the movable gear is rotated, substantially as described.

11. In a gear-cutting machine, the combination with a driving-shaft, of a cutter, means for operating the same from the driving-shaft, a traveling carriage, a spindle supported on the carriage, a chain of gears supported upon the carriage intermediate the driving-shaft and spindle for driving the latter, and devices intermediate the spindle and the carriage for moving said carriage, substantially as described.

In testimony whereof I have signed my name to this specification in the presence of two subscribing witnesses.

WILLIAM HENRY BEASTOW.

Witnesses:
  ADAM FOX,
  R. G. WILLIAMS.